United States Patent
Ha et al.

(10) Patent No.: US 6,590,221 B2
(45) Date of Patent: Jul. 8, 2003

(54) ON-LINE MEASURING SYSTEM FOR MEASURING SUBSTRATE THICKNESS AND THE METHOD THEREOF

(75) Inventors: Jong Eun Ha, Seoul (KR); Taek Cheon Kim, Suwon-si (KR); Ju Yeol Baek, Suwon-si (KR); Jae Seok Choi, Bucheon-si (KR); Jang Soo Choi, Suwon-si (KR)

(73) Assignee: Samsung Corning Co., Ltd. (KR)

( * ) Notice: Subject to any disclaimer, the term of this patent is extended or adjusted under 35 U.S.C. 154(b) by 34 days.

(21) Appl. No.: 10/010,910

(22) Filed: Dec. 5, 2001

(65) Prior Publication Data

US 2002/0072134 A1 Jun. 13, 2002

(30) Foreign Application Priority Data

Dec. 8, 2000 (KR) .......................................... 2000-74779

(51) Int. Cl.[7] .......................... G01M 21/86; G01V 8/00
(52) U.S. Cl. .......................... 250/559.27; 250/559.07; 250/559.19; 356/630
(58) Field of Search ...................... 250/559.07, 559.08, 250/559.12, 559.13, 559.19, 559.24, 559.27, 559.28, 559.36; 356/630, 632, 635; 382/154

(56) References Cited

U.S. PATENT DOCUMENTS

| 5,187,375 A | * | 2/1993 | Masten | 250/559.36 |
|---|---|---|---|---|
| 6,333,511 B1 | * | 12/2001 | Talmi | 250/559.36 |
| 6,515,295 B1 | * | 2/2003 | Sato et al. | 250/559.36 |

* cited by examiner

Primary Examiner—Stephone B. Allen
(74) Attorney, Agent, or Firm—Anderson Kill & Olick, PC

(57) ABSTRACT

An on-line measuring system for measuring a thickness of a transferred substrate includes a first image detector, a second image detector, an elevator, and a display device. After the first image detector indicates a vertical variation of a bottom surface of the substrate, the second image detector captures an image of the bottom surface of the substrate. The elevator perpendicularly moves the second image detector with respect to the bottom surface of the glass substrate, depending on the vertical variation of the bottom surface, such that a vertical distance between the bottom surface and the second image detector remains constant. Then, a controller processes the image of the bottom surface to calculate a distance between opposite edges of the bottom surface, thereby obtaining a thickness of the substrate.

13 Claims, 5 Drawing Sheets

ON-LINE MEASURING SYSTEM FOR MEASURING SUBSTRATE THICKNESS AND THE METHOD THEREOF

FIELD OF THE INVENTION

The present invention relates to a system for measuring a substrate thickness and a method thereof; and, more particularly, to an on-line measuring system and a method for accurately measuring a thickness of a substrate during a fabrication process thereof.

BACKGROUND OF THE INVENTION

Since a lot of defects may develop during a process of fabricating a substrate, various steps for a measurement or an inspection are usually added to the fabrication process to investigate the cause thereof to make correction accordingly, thereby preventing possible development of defects. That is to say, thickness, flatness, transmissivity, bubbles, extraneous substances, and scratches of the substrate are selectively measured or inspected during the fabrication process thereof.

A laser instrument is conventionally adopted for measuring the thickness of the substrate. The laser instrument is an interferometer, which usually includes a laser source, lenses, and detecting sensors. Each of the laser source, the lenses, and the detecting sensors should be precisely arranged with respect to the substrate, and the arrangement thereof is very difficult. Further, the detecting sensors of the laser instrument are conventionally highly sensitive to a mechanical vibration. Therefore, if the substrate moves or vibrates during the measurement, the laser instrument cannot accurately measure the thickness, or even the measurement itself may be impossible.

Accordingly, to use the laser instrument for measuring the substrate thickness, a substrate to be measured is conventionally taken out of a process line before the measurement, and after the measurement a measured substrate is returned into the production line for a next step of the process line. That is to say, though the laser instrument can be used for an off-line measurement, it cannot be used for an on-line measurement.

The off-line measurement, however, requires more manpower and more processing time, thereby causing a high cost as well as a low efficiency. Accordingly, the on-line measurement is preferred to the off-line measurement and various on-line measuring instruments are now developed to make a manufacturing system flexible. Conventional on-line measuring instruments, however, have difficulties in providing an accurate measurement.

SUMMARY OF THE INVENTION

It is, therefore, an object of the present invention to provide an on-line measuring system and a method thereof that measure a thickness of a substrate in a production line for fabricating the substrate.

It is another object of the present invention to provide an on-line measuring system and a method thereof where a moving speed and a height variation of a substrate are further measured and the measured values are fed back to be used for an accurate measurement of the substrate thickness.

It is still another object of the present invention to provide an on-line measuring system and a method thereof that provide results of measurements in real time, such that a flexible manufacturing system is made available.

In accordance with one aspect of the invention, there is provided an on-line measuring system for measuring a thickness of a transferred substrate, the system including: a first image detector indicating a vertical variation of a bottom surface of the substrate; a second image detector capturing an image of the bottom surface of the substrate, the bottom surface having two opposite edges; an elevator perpendicularly moving the second image detector with respect to the bottom surface of the glass substrate, the elevator being controlled based on the vertical variation of the bottom surface, such that a vertical distance between the bottom surface and the second image detector remains constant; and a controller for processing the image of the bottom surface to calculate a distance between the two opposite edges of the bottom surface, thereby obtaining a thickness of the substrate.

In accordance with another aspect of the invention, there is provided a method for measuring a thickness of a transferred substrate, the method including the steps of: detecting a transfer speed of the substrate; detecting a vertical variation of a bottom surface of the substrate; capturing an image of the bottom surface of the substrate, wherein a capturing speed and a capturing interval of the image are determined based on the transfer speed while a capturing focus thereof is determined on the basis of the vertical variation, the bottom surface having opposite edges; and processing the image to calculate a distance between the opposite edges of the bottom surface, thereby obtaining a thickness of the substrate.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Figure 1:
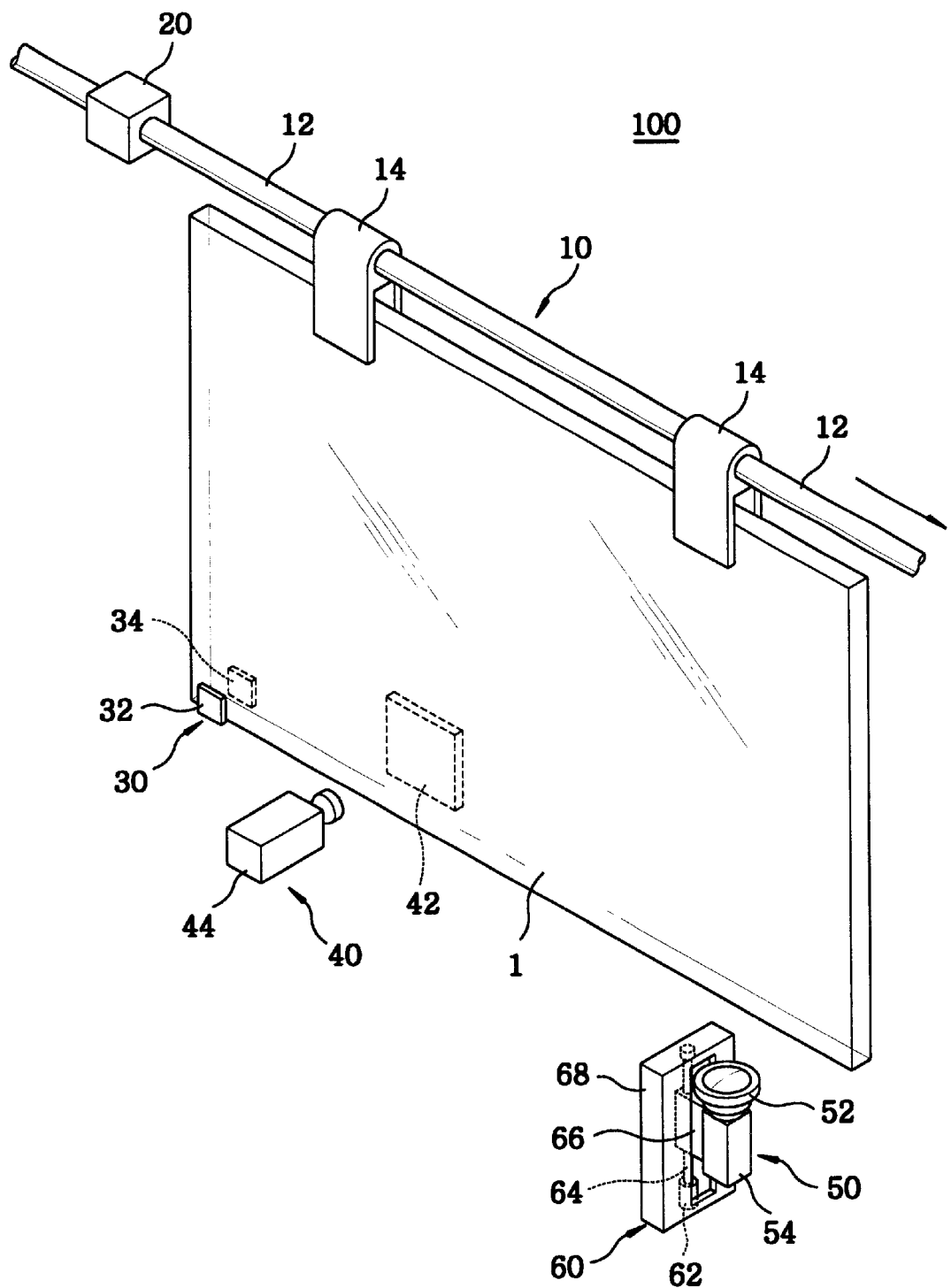
FIG. 1 is a perspective view illustrating an on-line thickness measuring system according to a preferred embodiment of the present invention.

Referring now to FIGS. 1 to 8, an on-line thickness measuring system 100 in accordance with a preferred embodiment of the present invention will be described in detail. Like numerals represent like parts in the drawings.

In FIG. 1, the on-line thickness measuring system 100 includes a first image detector 40, a second image detector 50 and an elevator 60 to measure a thickness of a substrate 1. The substrate 1 is a transparent substrate or an opaque substrate. Specifically, the substrate 1 may be a glass substrate used for an upper substrate or a lower substrate of a liquid crystal display (LCD). A conveyor 10 is used to transfer the substrate 1 from a previous to a next step in a fabrication process for fabricating the substrate 1.

The first image detector 40 is positioned near a lower portion of the substrate 1 and captures an image of the lower portion to estimate indicate a vertical variation of a bottom surface 2 (FIG. 2) of the substrate 1. The second image detector 50 is positioned under the bottom surface 2 (FIG. 3) of the substrate 1 and captures an image of the bottom surface 2 of the substrate 1 to indicate a thickness of the substrate 1. The elevator 60 perpendicularly moves the second image detector 50 with respect to the bottom surface 2 of the substrate 1, wherein the elevator 60 is controlled based on the height variation of the lower portion, such that a constant vertical distance is maintained between the second image detector 50 and the bottom surface 2.

The conveyor 10 includes a transfer axis 12 and at least one carriage 14, which clamps the substrate 1 and moves along the transfer axis 12 in a direction indicated by an arrow. At least one carriage 14 has a motor (not shown) to drive the carriage 14. Preferably, the motor has a pinion gear (not shown) attached to a drive shaft (not shown) thereof while the transfer axis 12 has a rack gear that corresponds to the pinion gear.

The thickness measuring system 100 preferably further includes a speed-detecting sensor 20 and a substrate-detecting sensor 30. The speed-detecting sensor 20 indicates a moving speed of the substrate 1 while the substrate-detecting sensor 30 indicates a start point of the substrate 1. After the substrate-detecting sensor 30 indicates the start point of the substrate 1, the first and the second image detector 40 and 50 start to operate by capturing images. An image capturing interval and a capturing speed of the first and the second image detector 40 and 50 are continuously adjusted in accordance with the moving speed of the substrate 1, such that a clear and accurate image is captured.

Though the speed-detecting sensor 20 is shown separated from the carriages 14 in the drawing for the sake of convenience, it is preferably joined to at least one of the carriages 14, such that it simultaneously moves together with the carriages 14. For example, the speed-detecting sensor 20 may be a tachometer coupled with the drive shaft (not shown) of the motor (not shown) to measure an angular speed of the pinion gear (not shown). Because the angular speed of the pinion is easily converted into a linear speed of the carriage 14, the moving speed of the carriages 14 or the substrate 1 can be obtained.

The substrate-detecting sensor 30 is positioned near main surfaces of the substrate 1 and includes a light-emitting device 32 and a light-receiving device 34, each facing one another. When the substrate 1 passes across a space interposed between the light-emitting device 32 and the light-receiving device 34, a start point of the substrate 1 is indicated. If the substrate 1 is transparent, the substrate-detecting sensor 30 preferably uses infrared rays to detect the start point of the substrate 1.

The substrate-detecting sensor 30, the first image detector 40, and the second image detector 50 are sequentially arranged in that order, which corresponds to a transfer direction of the substrate 1. Therefore, as the substrate 1 is transferred from the previous step in the direction indicated by the arrow, it sequentially passes the substrate-detecting sensor 30, the first image detector 40, and the second image detector 50.

The elevator 60 includes a guide case 68, a screw axis 64, an elevator motor 62, and a holder 66, which holds the second image detector 50. The first image detector 40 includes a first light source 42 and a first CCD camera 44 while the second image detector 50 includes a second light source 52 and a second CCD camera 54. Either a two-dimensional CCD camera or a one-dimensional CCD camera is preferably selected for each of the first and the second CCD camera 44 and 54, though various devices may be used as the first and the second CCD camera 44 and 54, respectively, as long as they can capture an image and convert the image into an image signal. Further, instead of even the first image detector 40, a height sensor may be adopted for the detection as long as the height sensor can accurately measure the vertical variation of the bottom surface 2 of the substrate 1.

Figure 2:
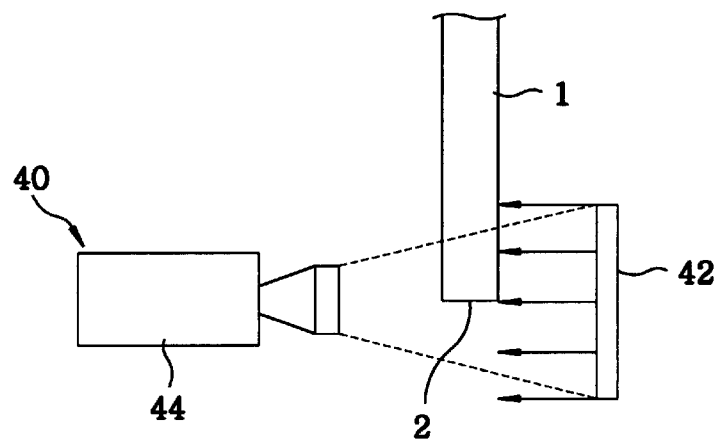
FIG. 2 is a front view illustrating a first image detector of the thickness measuring system of FIG. 1.
Figure 3:
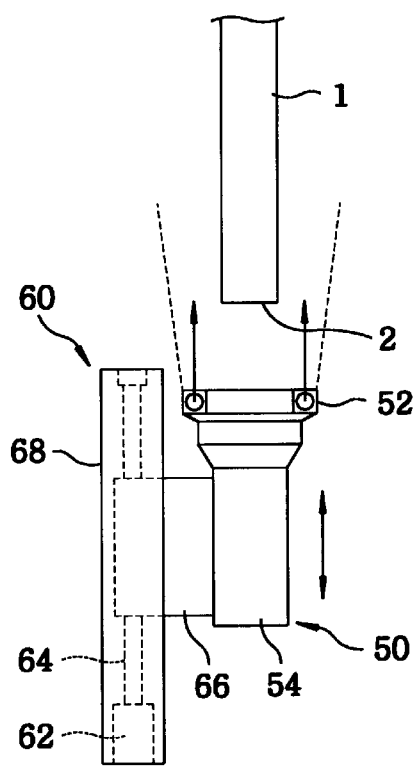
FIG. 3 is a front view illustrating a second image detector of the thickness measuring system of FIG. 1.

With reference to FIGS. 2 and 3, configurations and operations of the first image detector 40, the second image detector 50, and the elevator 60 will be explained in detail.

In FIG. 2, the first CCD camera 44 and the first light source 42 of the first image detector 40 are positioned near the lower portion of the substrate 1 having the bottom surface 2. The first light source 42 and the first CCD camera 44 face each other, and the substrate 1 passes across a space interposed between the first light source 42 and the first CCD camera 44. The first light source 42 projects rays of light onto a periphery of the lower portion of the substrate 1, such that there develops a differentiation in intensities of incident rays that are incident onto the first CCD camera 44. Using the differentiation in the intensities of the incident rays, the first CCD camera 44 captures an image of the lower portion of the substrate 1. The first CCD camera 44 subsequently converts the image into an edge image signal.

In FIG. 3, the second light source 52 and the second CCD camera 54 are positioned under the bottom surface 2 of the substrate 1. The second light source 52 is mounted on the second CCD camera 54, and the second CCD camera 54 is attached to the holder 66 of the elevator 60. The second light source 52 projects rays of light onto a periphery of the bottom surface 2 of the substrate 1. Because the bottom surface 2 reflects the projected rays, there occurs a differentiation in intensities of incident rays that are incident onto the second CCD camera 54. Using the differentiation in the intensities of the incident rays, the second CCD camera 54 captures an image of the bottom surface 2. The second CCD camera 54 subsequently converts the image into a thickness image signal.

Still referring to FIG. 3, the screw axis 64 and the elevator motor 62 of the elevator 60 are positioned inside the guide case 68 thereof, and the holder 66 thereof passes through the guide case 68 and is guided by the guide case 68. The screw axis 64 is directly or indirectly coupled with a drive shaft (not shown) of the elevator motor 62, such that the elevator motor 62 can rotate the screw axis 64. The holder 66 holds the second image detector 50 outside the guide case 68 and has a screw hole (not shown) formed to correspond to the screw axis 64. Because the holder 66 is coupled with the screw axis 64 via the screw hole and guided by the guide case 68, the rotation of the screw axis 64 linearly moves the holder 66 along the screw axis 64.

Figure 4:
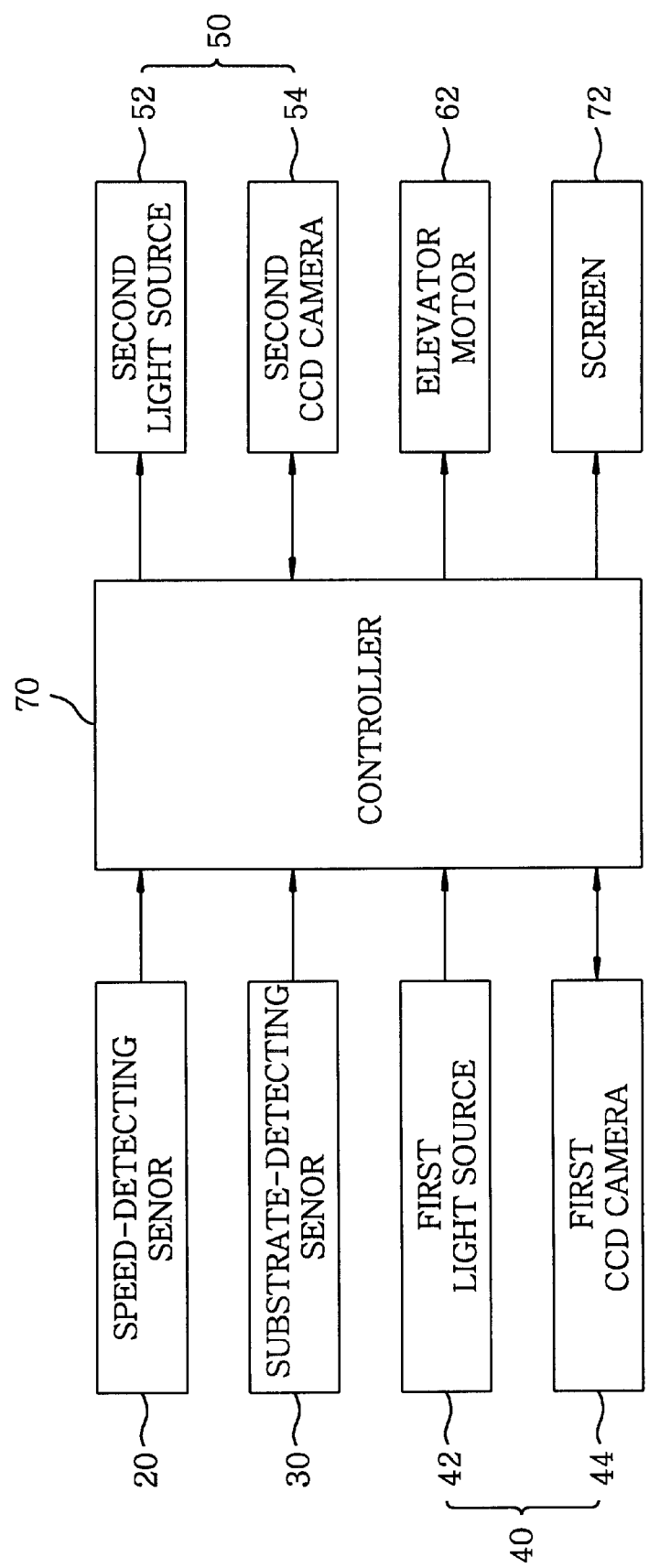
FIG. 4 is a control block diagram for the thickness measuring system according to the preferred embodiment of the present invention.

A control block diagram for the above-described online thickness measuring system 100 (FIG. 1) is illustrated in FIG. 4. A controller 70 is electrically connected to the speed-detecting sensor 20, the substrate-detecting sensor 30, the first image detector 40, the second image detector 50, the elevator motor 62, and a screen 72, which is a display device. The controller 70 is preferably a microcomputer having a preset program to control the on-line thickness measuring system 100 (FIG. 1).

With reference to FIGS. 2 to 4, a detailed explanation about the operation of the controller 70 will be provided.

When the substrate-detecting sensor 30 indicates the start point of the substrate 1, the controller 70 correspondingly outputs a control signal to operate the first image detector 40. Depending on the control signal, the first light source 42 is turned on, and the first CCD camera 44 captures the image of the lower portion of the substrate 1. The first CCD camera 44 converts the image into the edge image signal and subsequently transmits the edge image signal to the controller 70. The controller 70 processes the edge image signal into an edge image and simultaneously controls the screen 72 to display the edge image.

Because the first CCD camera 44 has a limited view, each edge image signal transmitted therefrom implements just a partial edge image of the substrate 1. Therefore, to display an overall edge image of the substrate 1, the controller 70 sequentially matches a present partial edge image to a previous partial edge image. If the two-dimensional CCD camera is selected for the first CCD camera 44, each partial edge image is displayed on a two-dimensional plane. Alternatively, if the one-dimensional CCD camera is selected for the first CCD camera 44, each partial edge image is displayed on a one-dimensional line, which is perpendicular to the transfer direction of the substrate 1.

Figure 5:
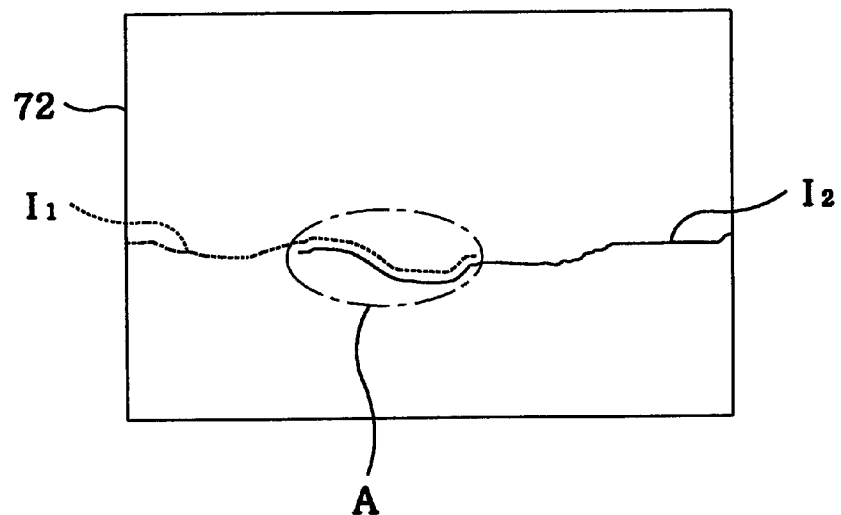
FIGS. 5 and 6 show respective edge images obtained from the first image detector of FIG. 2.
Figure 6:
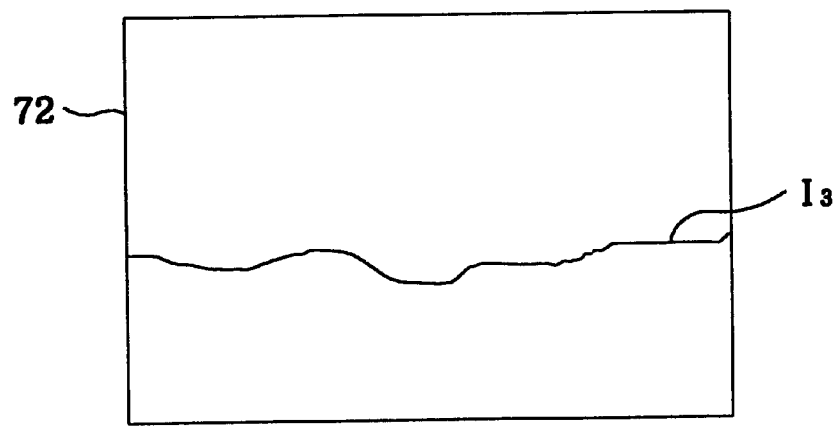

FIGS. 5 and 6 illustrate the above-mentioned matching of the adjacent partial edge images when the two-dimensional CCD camera is selected for the first CCD camera 44 (FIG. 2).

A first line "$I_1$" and a second line "$I_2$" displayed on the screen 72 in FIG. 5 are adjacent partial edge images, which are sequentially processed from a previous edge image signal and a present edge image signal, respectively. If the capturing interval of the camera is properly determined based on the transfer speed of the substrate 1 (FIG. 2), the first and the second line "$I_1$" and "$I_2$" have an overlap portion "A" where they correspond to each other. Though the first and the second line "$I_1$" and "$I_2$" are drawn spaced apart from each other for the sake of convenience, they identically correspond to each other at the overlap portion "A".

Then, the controller 70 (FIG. 4) matches the first and the second line "$I_1$" and "$I_2$" at the overlapping portion "A", such that a continuous third line "$I_3$" is displayed on the screen 72 in FIG. 6. The third line "$I_3$" fluctuates up and down in accordance with real vertical variations of the bottom surface 2 (FIG. 2). If a reference line is assumed being positioned under the third line "$I_3$", each point thereof has a corresponding height with respect to the reference line.

Returning to FIGS. 2 to 4, the above-mentioned height is calculated from the edge image signal at the controller 70. A calibration is preferably applied for the calculation of the height of the edge image, such that a calculated value of the height is identical to a corresponding real value, wherein the real value is a vertical distance manually measured from a reference plane, where the second image detector 50 is positioned, to the bottom surface 2 of the substrate 1.

The controller 70 drives the elevator motor 62 based on the edge image signal output from the first image detector 40, such that the elevator 60 moves the second image detector 50 up and down in accordance with the height of the edge image. At this point, because the substrate 1 continues to move from the first image detector 40 to the second image detector 50, a capturing timing of the first image detector 40 and a moving timing of the elevator 60 are preferably synchronized with respect to the moving speed of the substrate 1. Accordingly, a constant vertical distance is maintained between the second image detector 50 and the bottom surface 2. The constant vertical distance therebetween is preset to provide an optimum focus for the second CCD camera 54, such that the second CCD camera 54 maintains the optimum focus regardless of the vertical variations of the bottom surface 2.

Then, the controller 70 outputs another control signal to operate the second image detector 50. Depending on the control signal, the second light source 52 is turned on and the second CCD camera 54 captures an image of the bottom surface 2 of the substrate 1. The second CCD camera 54 converts the captured image into a thickness image signal and subsequently transmits the thickness image signal to the controller 70. The controller 70 processes the thickness image signal into a thickness image and simultaneously controls the screen 72 to display the thickness image.

Because the second CCD camera 54 also has a limited view, each thickness image signal transmitted therefrom implements just a partial thickness image of the substrate 1. Therefore, to display an overall thickness image of the substrate 1, the controller 70 sequentially matches a present partial thickness image to a previous partial thickness image.

Figure 7:
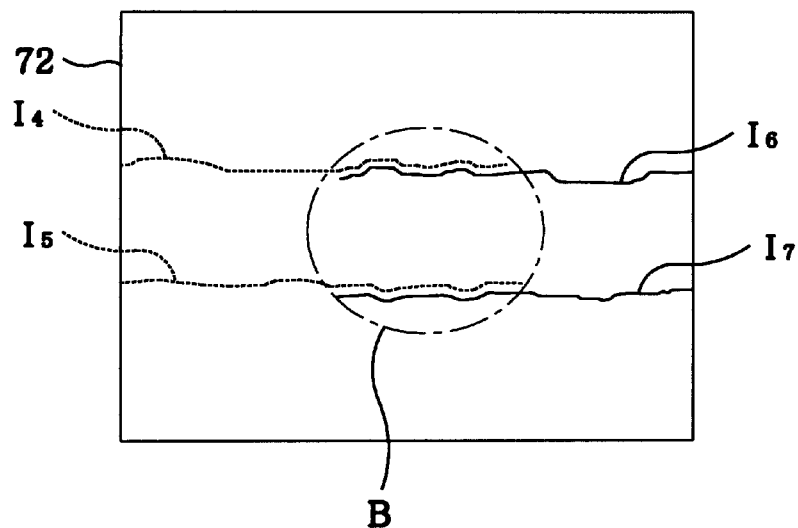
FIGS. 7 and 8 show respective thickness images obtained from the second image detector of FIG. 3.
Figure 8:
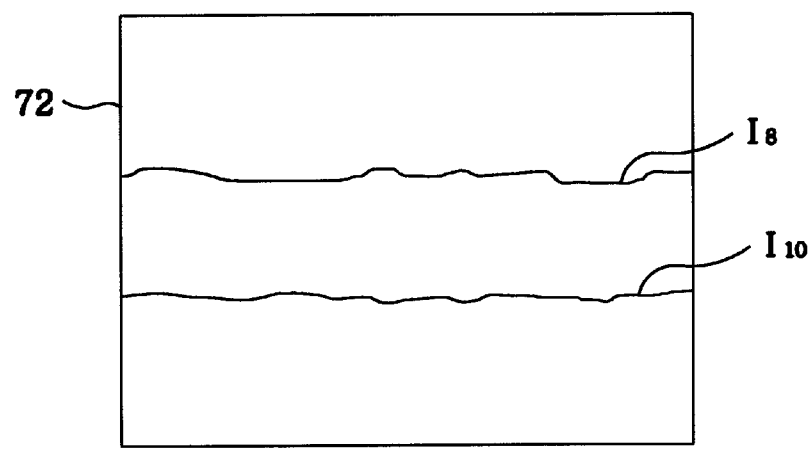

FIGS. 7 and 8 illustrate the above-mentioned matching of first and second thickness images displayed on the screen 72, when a two-dimensional CCD camera is selected for the second CCD camera 54. The first thickness image includes a fourth line "$I_4$" and a fifth line "$I_5$" while the second thickness image includes a sixth line "$I_6$" and a seventh line "$I_7$". The first and the second thickness image are the partial thickness images adjacent and overlapped at another overlap portion "B". Though the fourth and the sixth line "$I_4$" and "$I_6$" or the fifth and the seventh line "$I_5$" and "$I_7$" are drawn spaced apart from each other for the sake of convenience, they identically correspond to each other at the overlap portion "B".

The controller 70 (FIG. 4) matches the fourth and the sixth line "$I_4$" and "$I_6$" at the overlapping portion "B", such that a continuous eighth line "$I_8$" is displayed on the screen 72. Simultaneously, the controller 70 (FIG. 4) matches the fifth and the seventh line "$I_5$" and "$I_7$" at the overlapping portion "B", such that a continuous ninth line "$I_9$" is displayed on the screen 72. The eight and the ninth line "$I_8$" and "$I_9$" represent first and second edge of the bottom surface 2 (FIG. 3), respectively. Therefore, a vertical distance measured between the eighth line "$I_8$" and the ninth line "$I_9$" represents the thickness of the substrate 1 (FIG. 3).

Returning to FIGS. 3 and 4, the above-mentioned vertical distance is calculated from the thickness image signal at the controller 70. Another calibration is preferably applied for the calculation, such that the vertical distance corresponds to a real thickness of the substrate 1. As the substrate 1 is being transferred, the thickness as well as the thickness image of the substrate 1 is continuously displayed on the screen 72 in real time.

While the invention has been shown and described with respect to the preferred embodiments, it will be understood by those skilled in the art that various changes and modifications may be made without departing from the spirit and scope of the invention as defined in the following claims.

What is claimed is:

1. An on-line measuring system for measuring a thickness of a transferred substrate, the system comprising:
   a first image detector for indicating a vertical variation of a bottom surface of the substrate;
   a second image detector for capturing an image of the bottom surface of the substrate, the bottom surface having two opposite edges;

an elevator for perpendicularly moving the second image detector with respect to the bottom surface of the glass substrate, the elevator being controlled based on the vertical variation of the bottom surface, such that a vertical distance between the bottom surface and the second image detector remains constant; and a controller for processing the image of the bottom surface to calculate a distance between the two opposite edges of the bottom surface, thereby obtaining a thickness of the substrate.

2. The system of claim 1, further comprising a substrate-detecting sensor for indicating a start point of the substrate.

3. The system of claim 1, further comprising a speed-detecting sensor for indicating a transfer speed of the substrate, wherein a capturing interval and a capturing speed of the second image detector are determined based on the transfer speed of the substrate, and a timing of the movement of the elevator and another timing of indicating the vertical variation are synchronized with respect to the transfer speed of the substrate.

4. The system of claim 1, wherein the first image detector includes a first light source and a first CCD camera, the first light source projecting rays of light onto a periphery of a lower portion of the substrate, the first CCD camera capturing an image of the lower portion to indicate the vertical variation of the bottom surface of the substrate.

5. The system of claim 4, wherein the first CCD camera is a one-dimensional CCD camera.

6. The system of claim 4, wherein the first CCD camera is a two-dimensional CCD camera.

7. The system of claim 1, wherein the second image detector includes a second light source and a second CCD camera, the second light source projecting rays of light onto the bottom surface of the substrate, the second CCD camera capturing the image of the bottom surface.

8. The system of claim 7, wherein the second CCD camera is a one-dimensional CCD camera.

9. The system of claim 7, wherein the second CCD camera is a two-dimensional CCD camera.

10. The system of claim 1, wherein the first image detector is a height sensor.

11. The system of claim 1, wherein the elevator includes:

an elevator motor controlled based on the vertical variation of the bottom surface of the substrate;

a screw axis rotated by the elevator motor;

a holder coupled with the screw axis, the holder holding the second image detector; and a guide case guiding the holder, such that the holder linearly moves along the screw axis.

12. The system of claim 1, further comprising a display device to display the thickness of the substrate.

13. A method of measuring a thickness of a transferred substrate, the method comprising steps of:

detecting a transfer speed of the substrate;

detecting a vertical variation of a bottom surface of the substrate;

capturing an image of the bottom surface of the substrate, wherein a capturing speed and a capturing interval for capturing the image are determined based on the transfer speed while a capturing focus therefor is determined depending on the vertical variation, the bottom surface having opposite edges; and processing the image to calculate a distance between the opposite edges of the bottom surface, thereby obtaining a thickness of the substrate.

* * * * *